Jan. 2, 1951 R. G. NORTH 2,536,765
GARMENT RACK FOR AUTOMOBILES
Filed June 24, 1947
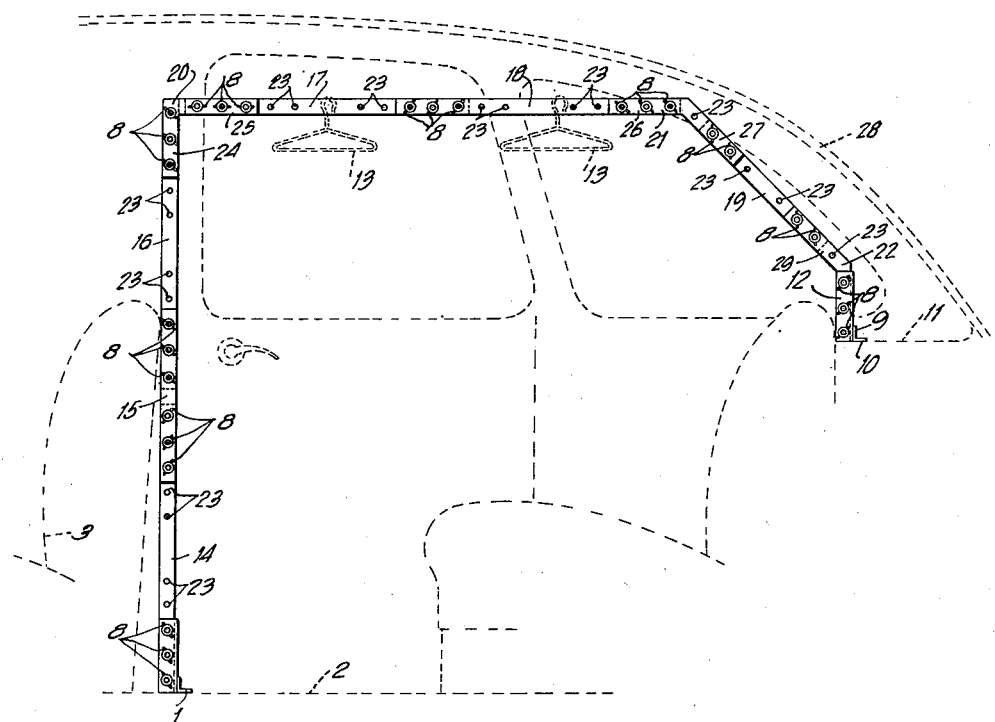
FIG. 1
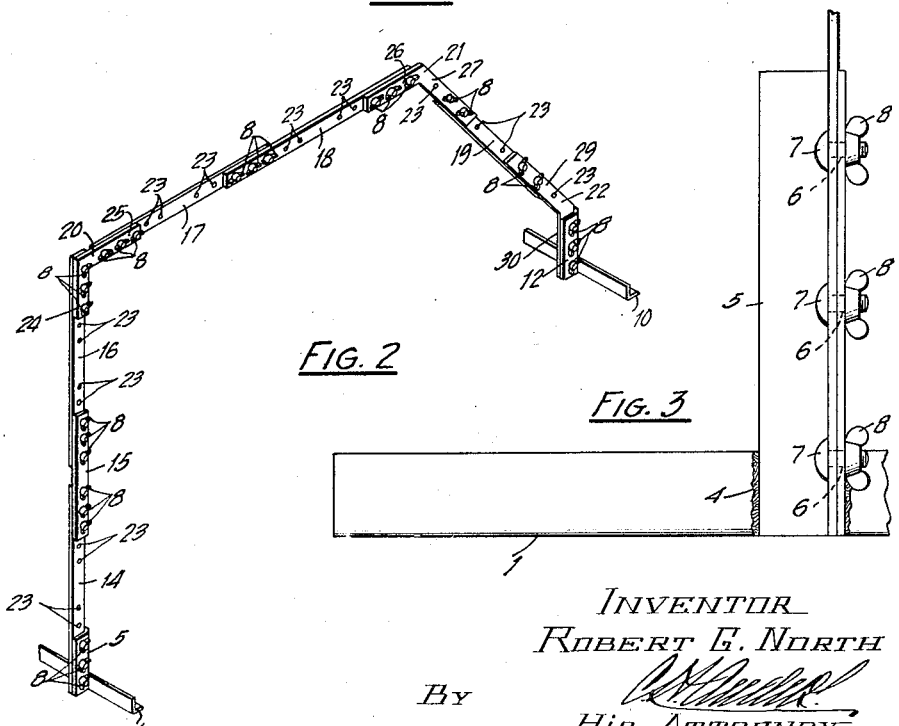
FIG. 2
FIG. 3
INVENTOR
ROBERT G. NORTH
By
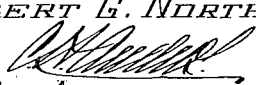
HIS ATTORNEY Patented Jan. 2, 1951

2,536,765

UNITED STATES PATENT OFFICE 2,536,765

GARMENT RACK FOR AUTOMOBILES

Robert G. North, Dalton, Mass.

Application June 24, 1947, Serial No. 756,757

3 Claims. (Cl. 224—29)

My invention relates to garment racks and particularly to a coat or garment rack especially adapted for use in an automobile having an enclosed body with a ledge disposed between the back of a rear seat of said automobile and the interior back of the body.

One of the objects of my invention is to provide a rack of such design that it may be easily assembled and installed in an automobile for hanging garments thereon when on a vacation or business trip, but which may be readily disassembled and stored in a comparatively small place. Another object is to provide a device of this character which is adjustable to fit properly within automobile bodies of different height and shape. A further object is to provide a rack of this character which is so adjustable that, when installed, it will lie closely adjacent the interior top of an automobile body and may be made to conform approximately to shape thereto.

I accomplish these objects by means of the novel elements and the combinations and arrangements thereof described below and illustrated in the accompanying drawing in which—

Fig. 1 is a side elevation view of my device as installed in an automobile; a fragmentary portion of the automobile body being shown in dotted outline;

Fig. 2 is a perspective view of the device; and

Fig. 3 is an enlarged elevation view of one of the feet or supports for the rack.

My device comprises a first foot 1, here shown as consisting of an angle iron having a horizontal leg adapted to rest on the floor 2 of the automobile behind the front seat 3 thereof. Welded to the upstanding leg of the angle iron 1, as shown at 4 in Fig. 3, is an angle iron 5; the leg of said angle iron which is normal to the upstanding leg of the angle iron 1, is provided with vertically-spaced holes 6 therein adapted to receive bolts 7 having wing nuts 8 cooperating therewith.

A second foot 9, which may be identical with the foot 8, consists of an angle iron 10 adapted to extend transversely of the automobile and rest upon the top of the ledge 11 between the inside back of the body and the back of the rear seat. This foot is provided with an upstanding angle member 12, like the upstanding member 5 of the foot 1, which is welded to the foot 10, and is also provided with spaced, vertical holes therein adapted to receive bolts identical with the bolts 7 and having wing nuts 8 thereon identical with the wing nuts 8 which are associated with the foot 1.

The rack proper, from which garment hangers 13 may be suspended, comprises a plurality of separate sections, here shown as flat bars of which 14, 15, 16, 17, 18 and 19 are straight, and 20, 21 and 22 are bent, as shown in Figs. 1 and 2. All of the bars, 14–22 inclusive, are provided with longitudinally-spaced holes therein, such as shown at 23, adapted to receive bolts 7 having wing nuts 8 thereon whereby said sections may be detachably secured together so that the height, length, and to some degree the shape, of the rack may be adjusted to fit properly in various bodies.

Thus, the bars 14, 15 and 16 are secured together, the lowermost bar 14 is secured to the angle 5 on the foot 1 and the length of the upright member thus formed is adjusted so that the upper end of the bar 16 is fairly close to the inside top of the automobile body. Secured to the upper end of the bar 16 by means of similar bolts and wing nuts 8 is the flat bar 20 having portions 24 and 25 disposed at right angles to each other to form a corner of the rack. The bars 17 and 18 are secured together, and the assembly is secured to the horizontally-extending portion 25 of the bar 20 by means of similar bolts and wing nuts to form the generally-horizontally-extending top member of the rack.

Secured to the rear end of the bar 18 in a similar way is the bent bar 21 having portions 26 and 27 which are disposed to each other with the included angle therebetween substantially in excess of 90° so that the portion 27 of the bar 21 slopes downwardly and rearwardly from the top of the rack to conform approximately to the downwardly and rearwardly sloping portion 28 of the top of the rear of the automobile body.

Secured to the upstanding portion 12 of the foot 10 which rests upon the ledge 11, is the bent bar 22, which may be substantially identical with the bar 21, having portions 29 and 30 which are angularly-disposed to each other; the portion 29 extending upwardly and forwardly from the upstanding member 12 on the foot 10 in alignment with the portion 27 of the bent bar 21. The portions 27 and 29 of the bent bars 21 and 22 are connected together by the bar 19 which is secured thereto by bolts 7 and wing nuts 8.

From the foregoing it will be apparent that I have provided a stable garment rack which, since it may be adjusted to lie quite close to the interior roof of the automobile body and conform generally in shape or alignment thereto, is positioned where it will not inconvenience passengers occupyinng the rear seat of the automobile and, since the rack comprises a plurality of sections which are detachably secured together, it may be readily assembled or disassembled and adjusted properly to fit any automobile body of the character described.

While I have described and illustrated the various elements which go to make up my rack as consisting of flat bars, some of which are bent and some of which are straight, it is to be understood that the invention is not limited to bars of this particular shape because it seems quite obvious that bars of various modified shapes might well be substituted therefor.

Hence, it is to be understood that the words which I have used in describing my invention are words of description rather than of limitation and that changes, within the purview of the appended claims, may be made without departing from the true scope and spirit of my invention in its broader aspects.

What I claim is:

1. A garment rack for use in an automobile having an enclosed body, a floor, a front seat, a rear seat, and a ledge disposed between the back of said rear seat and the interior back of said body; said rack comprising a first foot adapted to rest upon the floor of said automobile behind said front seat and form a stable support for one end of said rack, an adjustable upright member secured to said first foot and comprising a plurality of separate sections and means positively but detachably securing said sections together; whereby the height of said member may be adjusted; a second foot adapted to rest on said ledge and form a stable support for the other end of said rack; said second foot having an adjustable member extending upwardly and forwardly therefrom and comprising a plurality of separate sections and means positively but detachably securing said sections together; whereby the height and shape of said member may be adjusted so that said member will lie closely adjacent the interior rear top of said automobile body; an adjustable bar adapted to have garment hangers suspended therefrom and comprising a plurality of separate sections and means positively but detachably securing said sections together; whereby the length of said bar may be adjusted to conform to the spacing of said feet; and means securing the ends of said bar to said members.

2. A garment rack for use in an automobile having an enclosed body, a floor, a front seat, a rear seat, and a ledge disposed between the back of said rear seat and the interior back of said body; said rack comprising a first foot adapted to rest upon the floor of said automobile behind said front seat and form a stable support for one end of said rack, an adjustable upright member secured to said first foot and comprising a plurality of flat rigid bars having longitudinally spaced openings therein and means extending through said openings and positively but detachably securing said bars together; whereby the height of said member may be adjusted; a second foot adapted to rest on said ledge and form a stable support for the other end of said rack; said second foot having an adjustable member extending upwardly and forwardly therefrom and comprising a plurality of separate sections and means positively but detachably securing said sections together; whereby the height and shape of said member may be adjusted so that said member will lie closely adjacent the interior top of said automobile body at the rear thereof; means comprising a plurality of separate flat rigid bars having a plurality of longitudinally spaced openings therein and means extending through said openings positively but detachably securing said bars together to form a single rigid bar of adjustable length extending between said members; and means positively but detachably securing the ends of said single bar to said members to form a support from which garment hangers may be suspended.

3. A garment rack for use in an automobile having an enclosed body, a floor, a front seat, a rear seat, and a ledge disposed between the back of said rear seat and the interior back of said body; said rack comprising a first member, including a foot adapted to rest upon the floor of said automobile behind said front seat and form a stable support for one end of said rack, extending upwardly to a zone adjacent the interior top of said body; a second member, including a foot adapted to rest on said ledge and form a stable support for the other end of said rack, said second member having a portion extending upwardly and forwardly therefrom and comprising a plurality of separate sections and means positively but detachably securing said sections together; whereby the height and shape of said second member may be adjusted to lie closely adjacent the interior top of said automobile body at the rear thereof; a rigid bar adapted to have garment hangers suspended therefrom and comprising a plurality of separate sections and means positively and rigidly but detachably securing said sections together, and means securing the ends of said bar to said members; whereby the length of said bar may be adjusted to conform to the spacing of said members.

ROBERT G. NORTH.

REFERENCES CITED

The following references are of record in the file of this patent:

UNITED STATES PATENTS

| Number | Name | Date |
| --- | --- | --- |
| 1,015,448 | Madden | Jan. 23, 1912 |
| 1,294,916 | Knight | Feb. 18, 1919 |
| 1,604,837 | Morden | Oct. 26, 1926 |
| 1,666,622 | Hess | Apr. 17, 1928 |
| 2,196,196 | Dorsey | Apr. 9, 1940 |
| 2,336,274 | Mazet | Dec. 7, 1943 |